United States Patent
Altekruse et al.

(12) 
(10) Patent No.: US 6,444,950 B1
(45) Date of Patent: Sep. 3, 2002

(54) MIG GUN NOZZLE WITH SELF CENTERING, QUICK RELEASE SCREW AND REDUCED CROSS-SECTIONAL AREA AT THE FRONT

(75) Inventors: Kenneth C. Altekruse, Appleton, WI (US); James E. Doherty, Barrington, IL (US)

(73) Assignee: Illinois Tool Works, Inc., Glenview, IL (US)

(*) Notice: Subject to any disclaimer, the term of this patent is extended or adjusted under 35 U.S.C. 154(b) by 21 days.

(21) Appl. No.: 09/788,039

(22) Filed: Feb. 16, 2001

(51) Int. Cl.[7] .................................................. B23K 9/16
(52) U.S. Cl. ................................................... 219/137.42
(58) Field of Search ............................ 219/137.31, 137.42, 219/137.61

(56) References Cited

U.S. PATENT DOCUMENTS

| | | | |
|---|---|---|---|
| 3,025,387 A | 3/1962 | Kinney | 219/130 |
| 3,283,121 A | 11/1966 | Bernard et al. | 219/130 |
| 3,514,570 A | 5/1970 | Bernard et al. | 219/130 |
| 3,689,733 A | 9/1972 | Matasovic | 219/130 |
| 4,158,763 A * | 6/1979 | Moerke | 219/137.42 |
| 4,297,561 A | 10/1981 | Townsend et al. | |
| 4,529,863 A | 7/1985 | Lebel | 219/137.42 |
| 4,554,432 A | 11/1985 | Raioff | 219/137.43 |
| 4,560,858 A * | 12/1985 | Manning | 219/137.44 |
| 4,731,518 A * | 3/1988 | Parmelee et al. | 200/505 |
| 4,864,099 A | 9/1989 | Cusick, III et al. | 219/137.62 |
| 5,760,373 A * | 6/1998 | Colling | 219/137.61 |
| 6,307,179 B1 * | 10/2001 | Walters, III | 219/137.42 |

OTHER PUBLICATIONS

1 Drawing from OXO Welding Equipment Co.

* cited by examiner

Primary Examiner—M. Alexandra Elve
Assistant Examiner—Kevin McHenry
(74) Attorney, Agent, or Firm—Mark W. Croll; John H. Pilarski

(57) ABSTRACT

A MIG welding gun has a diffuser with an external thread and a frusto-conical back ramp. A nozzle assembly includes an insert with a back ramp and a thread that mates with the diffuser thread. The threads of the diffuser and insert have respective ramps that mate. A single turn of the nozzle assembly on the diffuser causes simultaneous engagement of the insert and diffuser back ramps and of the insert and diffuser thread ramps. Such engagement centers the nozzle to be concentric with the diffuser and also produces a wedging action that retains the nozzle assembly on the diffuser until a relatively substantial reverse torque is applied to the nozzle assembly. The nozzle front end has a narrow annulus, which reduces the amount of radiant heat from the welding arc that reaches the nozzle.

39 Claims, 2 Drawing Sheets

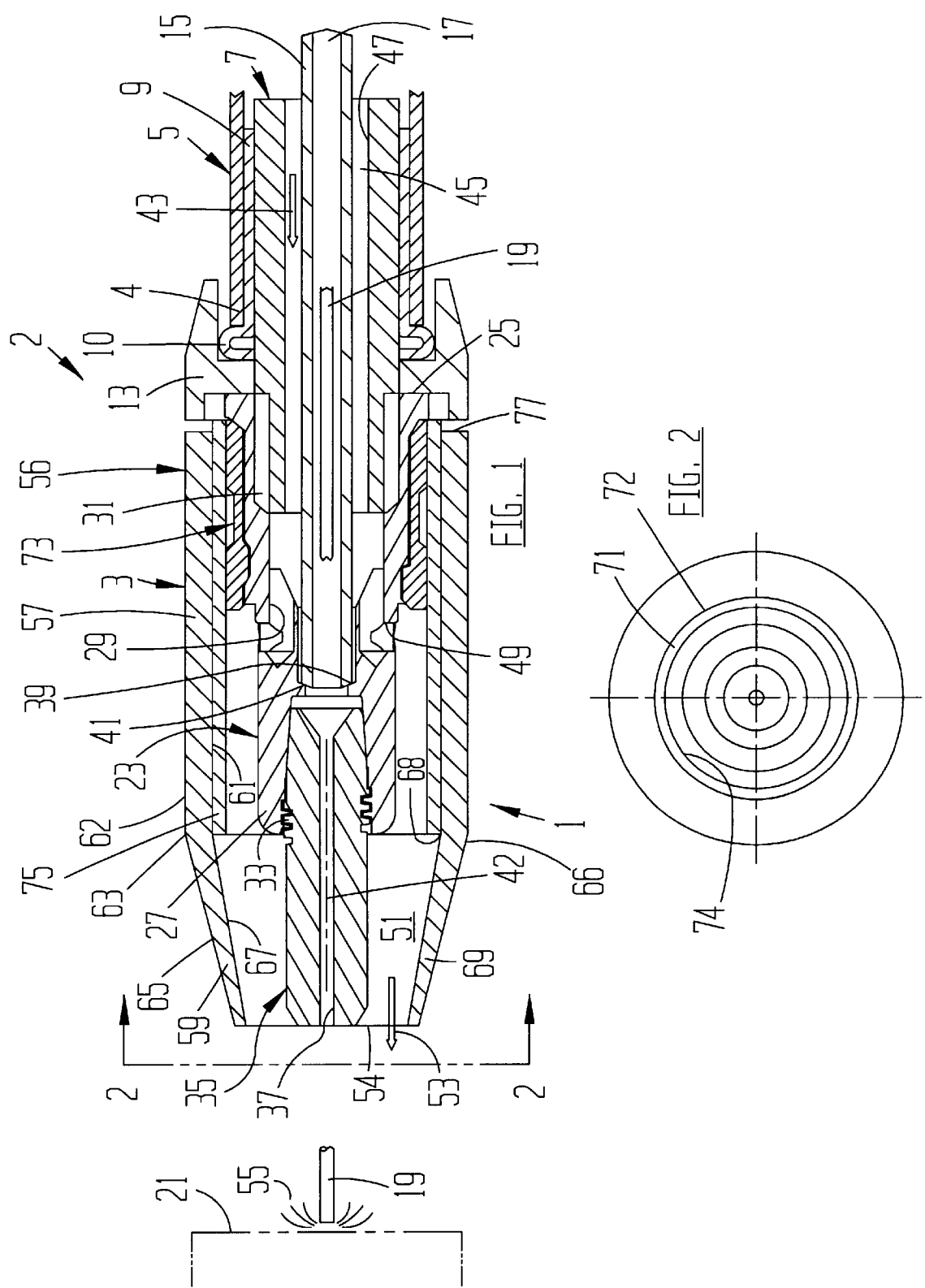

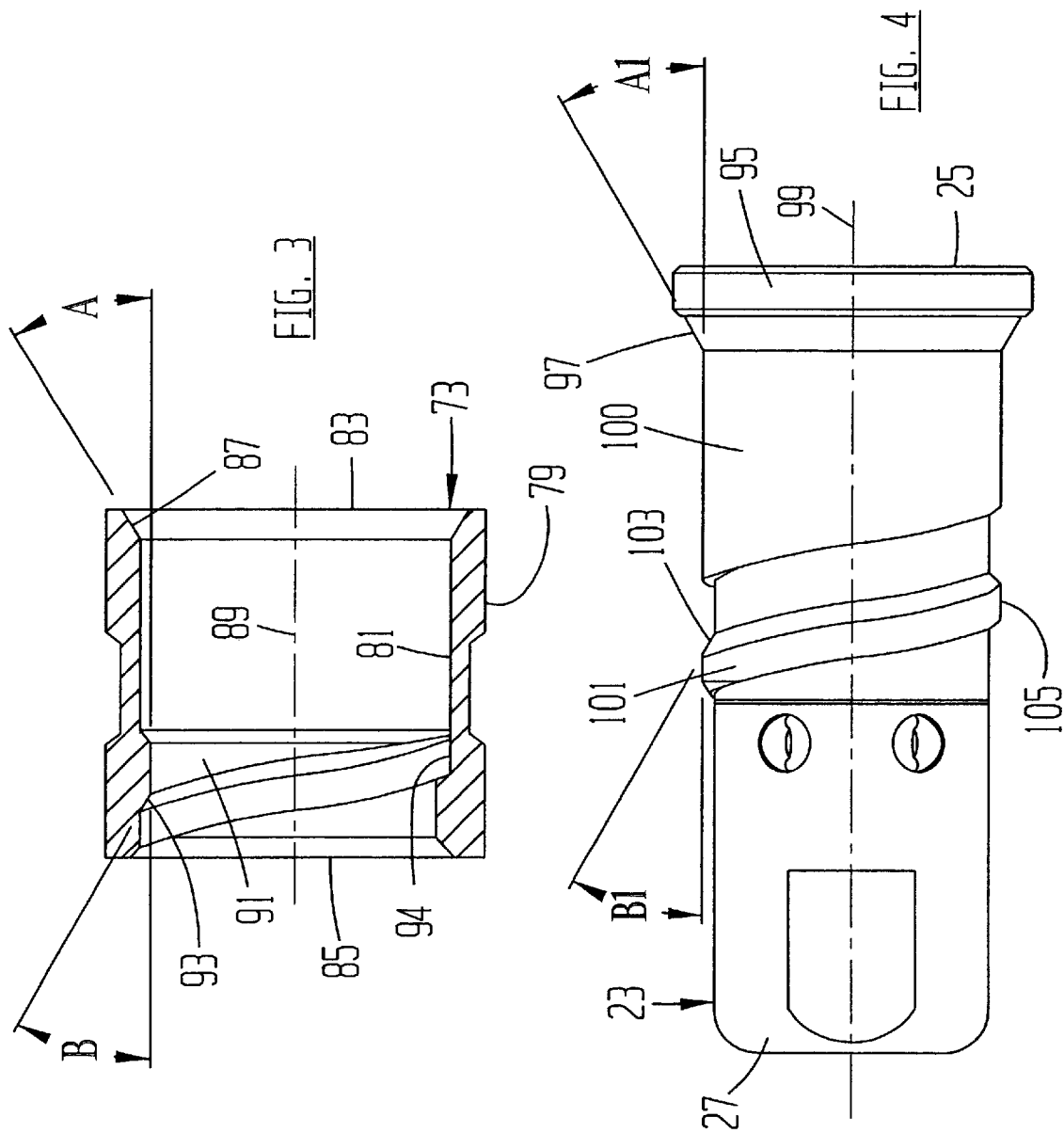

MIG GUN NOZZLE WITH SELF CENTERING, QUICK RELEASE SCREW AND REDUCED CROSS-SECTIONAL AREA AT THE FRONT

BACKGROUND OF THE INVENTION

1. Field of the Invention.

This invention pertains to welding guns, and more particularly to the nozzles and diffusers of MIG welding guns.

2. Description of the Prior Art.

MIG welding guns are composed of several components that must work together if successful welding is to occur. In addition, for the gun to be acceptable to the welding industry, the various components must be easy to assemble and disassemble.

An especially important welding gun component is the nozzle, which directs inert gas to shield the welding arc from atmospheric air. The nozzle is part of a nozzle assembly, which includes the outer tubular nozzle, a tubular insulator inside the nozzle, and in some cases, a metal insert inside the insulator. The nozzle has a front end that is unsupported and is close to the welding arc. The nozzle back end is retained by the insulator or insert to another gun component, such as a diffuser. The diffuser is at the downstream end of a head tube that extends from the gun handle. A contact tip is connected to a downstream end of the diffuser and is generally surrounded by the nozzle front end. The inert gas flows through an annular passage between the nozzle front end and the contact tip to the welding arc.

Prior nozzles assemblies can be classified in two categories: slip-on, and screw-on. In a slip-on nozzle assembly design, a formed retaining sleeve or retaining rings are used between the nozzle assembly and the diffuser. The diffuser may have grooves in an outer diameter that contain the retaining sleeve or rings. The retaining sleeve or rings create an interference fit between their outer diameters and the inner diameter of the nozzle assembly. The nozzle assembly is forced over the retaining sleeve or rings to create a frictional force that holds the nozzle assembly to the diffuser. The retaining sleeve or rings do not provide a solid connection between the nozzle assembly and the diffuser so as to maintain the nozzle concentric with the diffuser and the contact tip. Eccentricity between the nozzle and the contact tip is detrimental, because it causes uneven flow of the inert gas around the contact tip and welding arc. Another disadvantage of the slip-on nozzle assembly design is that there is no way to positively maintain the nozzle longitudinally in place on the welding gun. Positive retention of the nozzle is especially important during rough usage, as, for example, if an operator uses the nozzle to knock slag from the workpiece. Maintaining proper longitudinal relationship between the nozzle and the contact tip is necessary for satisfactory welding. In addition, in high heat welding conditions, the nozzle and retaining sleeve or rings get hot, which can cause the retaining sleeve or rings to soften and allow the nozzle assembly to fall off the gun.

A screw-on nozzle assembly utilizes several turns of threads to retain it on the diffuser. Normal manufacturing tolerances of the threads allow lateral movement of the nozzle from a true concentric position relative to the diffuser and the contact tip. A screw-on nozzle assembly normally has an insulated flat end surface that abuts a flat surface on the diffuser when the nozzle assembly is fully turned onto the diffuser. Retention of the nozzle assembly on the diffuser depends on a hard stop between the abutting flat surfaces of the nozzle assembly and diffuser. Removal of the nozzle assembly from the diffuser requires turning it through all of the several threads in engagement. In high heat conditions, the parts distort, and removal of the screw-on nozzle assembly is difficult.

The welding arc is, of course, extremely hot. Some heat from the arc transfers by radiation to the nozzle front end. Such heat transfer to the nozzle is detrimental, as it is a major cause of metal distortion and softening of the nozzle material. The annealing temperature of copper, the material from which some nozzles are made, is approximately 800 degrees F. It is highly desirable that the operating temperature of the nozzle assembly be well below that temperature in order that the nozzle maintain its strength and thus be able to withstand rough handling during use.

The heat in the nozzle dissipates in several ways. One way is for the heat to radiate to the atmosphere. Some of the heat is carried away by convection of air past the nozzle. Additional nozzle heat is transferred by conduction through the diffuser and head tube to the gun handle.

Under some conditions, particularly when the temperature difference is greater than approximately 300 degrees F., heat can be transferred by radiation from the. nozzle to the contact tip. Consequently, a hot nozzle can raise the temperature of the contact tip. A hot contact tip is undesirable, because it has a shorter service life and reduced performance compared to a cool contact tip. A cool contact tip also minimizes heat transfer by conduction through the diffuser and head tube to the gun handle. Accordingly, an. important benefit of a cool nozzle is that it tends to keep the contact tip cool and it also keeps heat distortion of the nozzle to a minimum.

During the course of a welding operation, it is sometimes necessary to replace the contact tip. To do so, it is first necessary to remove the nozzle in order to gain access to the contact tip. In a screw-on nozzle design, the operator must turn the nozzle until it advances off the diffuser. Grabbing the hot nozzle with a gloved hand is cumbersome and potentially uncomfortable, so it is highly desirable that the nozzle be removed as quickly and easily as possible. However, standard threaded connections between the nozzle and diffuser require that the operator turn the nozzle through all the several turns of the mating threads before the nozzle advances off the diffuser. After replacing the contact tip, the reverse procedure of rethreading the hot nozzle on the diffuser must be performed.

Thus, further developments are needed in MIG welding guns.

SUMMARY OF THE INVENTION

In accordance with the present invention, a MIG gun nozzle with self centering, quick release screw and reduced cross-sectional area at the front is provided that has greatly improved thermal and mechanical characteristics compared to prior guns. This is accomplished by designing the nozzle with a minimum frontal area and with ramps that center and retain the nozzle on the diffuser.

The nozzle has front and back ends. At the back end is a cylindrical tubular section with inner and outer diameters and a relatively thick wall. At the front end of the cylindrical section is a hollow frusto-conical section. The frusto-conical section has inner and outer surfaces that converge toward the nozzle front end. At the junction of the cylindrical and frusto-conical sections, the wall of the frusto-conical section has the same thickness as the wall of the cylindrical section, and the frusto-conical section inner surface is coincident with the cylindrical section inner diameter. The wall thickness of the frusto-conical section at the nozzle front end is less than the wall thickness at the junction of the cylindrical and frusto-conical sections such that the nozzle front end is a narrow annulus.

The nozzle of the invention has a screw-on design. In the preferred embodiment, the nozzle is part of a nozzle assembly that also includes an insulator and an insert. The nozzle assembly insert has an internal thread with a pitch of only a few threads per inch.

The diffuser has an external thread that mates with the thread on the nozzle assembly insert. Preferably, the diffuser is designed such that the nozzle assembly is fully assembled to the diffuser by only a single turn. After the nozzle assembly has advanced through the single turn, the insert contacts a stop on the diffuser.

Further in accordance with the present invention, the nozzle is centered concentrically with the diffuser when the nozzle assembly is fully assembled to the diffuser. For that purpose, the diffuser stop is fabricated as an exterior frusto-conical back ramp that makes a predetermined angle with the diffuser longitudinal axis. There is an interior back ramp on the nozzle assembly insert. The insert back ramp is designed to engage the back ramp on the diffuser when the nozzle is fully assembled to the diffuser. In addition, there is a ramp on the diffuser thread that is oriented oppositely as the diffuser back ramp. Specifically, the flank of the diffuser thread between the thread root and tip is formed as a thread ramp. The angle that the thread ramp makes with the diffuser longitudinal axis is preferably equal to the angle that the diffuser back ramp makes with the diffuser longitudinal axis. The thread of the insert has a ramp that is complimentary to the diffuser thread ramp.

If desired, the insulator can be manufactured with the internal threads and ramp. In that case, a separate insert is not needed.

As the nozzle assembly is assembled to the diffuser, the insert thread ramp slides around the diffuser thread ramp. As the nozzle assembly approaches its fully turned condition, the insert back ramp approaches and then engages the diffuser back ramp. A slight torque on the nozzle produces a wedging action of the insert on the diffuser. The wedging action occurs because of the simultaneous engagement of the surface areas of the insert thread and back ramps with the surface areas of the diffuser thread and back ramps, respectively. The wedging action performs two simultaneous functions. First, the wedging action automatically centers the insert and nozzle assembly to be concentric with the diffuser. Second, the wedging action causes the insert and nozzle assembly to become tightly retained against loosening on the diffuser. To release the nozzle assembly, a relatively substantial reverse torque must be applied.

During operation, the nozzle remains exceptionally cool. The narrow annulus at the nozzle front end is practically the only place on the nozzle that is in a direct line of sight with the welding arc. Consequently, only a minimal amount of radiant heat from the welding arc reaches the nozzle. At the same time, the much larger areas of the outer surfaces of the nozzle cylindrical and frusto-conical sections that are in the shadow of the arc allow any heat to escape by radiation and convection. Consequently, the nozzle operates at a relatively cool temperature, which enhances both its performance and that of the contact tip.

Other advantages, benefits, and features of the present invention will become apparent to those skilled in the art upon reading the detailed description of the invention.

BRIEF DESCRIPTION OF THE DRAWINGS

FIG. 1 is a cross-sectional view of a portion of the MIG gun nozzle with self centering, quick release screw and reduced cross-sectional area at the front.

FIG. 2 is a view taken along line 2—2 of FIG. 1.

FIG. 3 is a longitudinal cross-sectional view on an enlarged scale of the insert used with the MIG gun of the present invention.

FIG. 4 is an enlarged side view of the diffuser of the invention.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring first to FIGS. 1 and 2, the outlet portion 1 of a MIG welding gun 2 is illustrated that includes the present invention. The welding gun outlet portion 1 is located at one end 4 of a head tube 5 that is part of the welding gun 2. A second end of the head tube 5 is secured to a handle of the gun, not shown but well known to persons skilled in the art. Inside the head tube end 4 is a tubular conductor 7. The head tube is pressed over the conductor 7, with an electrically insulative sleeve 9 between them. The insulator sleeve 9 preferably has a flange portion 10 that lies against the head tube end 4. An insulative ring 13 surrounds the conductor adjacent the insulative sleeve flange portion 10. Inside the conductor is a liner 15. The liner 15 has an interior 17 that is sized to guide a weld wire 19 toward a workpiece typically represented at reference numeral 21.

The gun portion 1 further comprises a diffuser 23. The diffuser 23 has an upstream end 25, a downstream end 27, and a bore 29. In the diffuser bore 29 at the upstream end 25 are internal threads 31. The diffuser screws onto the conductor 7 by means of the threads 31, with the insulative ring 13 squeezed between the diffuser upstream end and the insulative sleeve flange portion 10. The diffuser bore has a locating surface 39, which, as is illustrated in FIG. 1, may be frusto-conical in shape. The liner 15 has a downstream end 41 with a complimentary shape. Accordingly, the liner downstream end 41 is positively located against the diffuser locating surface 39. There are internal threads 33 in the diffuser bore at the diffuser downstream end 27. A contact tip 35 connects to the diffuser downstream end by means of the threads 33. The contact tip has a hole 37 through it that guides the weld wire 19 from the liner 15 to the workpiece 21. The conductor 7, diffuser, and contact tip define a common longitudinal axis 42.

A nozzle 3 surrounds the diffuser 23 and the contact tip 35. In the illustrated construction, the nozzle 3 is part of a nozzle assembly 56 that also includes a tubular insert 73, and an electrically insulative insulator 75 between the nozzle and the insert. However, in some applications the insulator and the insert can be combined into a single component made from an electrically insulative material. The nozzle, insert 73, and insulator 75 are pressed together, with the insert being at the back end 77 of the nozzle.

During operation of the MIG gun 2, an inert gas flows in a downstream direction 43 from a welding machine through an annular passage 45 between the conductor inner diameter 47 and the liner 15. From the annular passage 45, the inert gas flows to the diffuser bore 29 and out radial holes 49 into a second annular passage 51 between the nozzle 3, the diffuser downstream end 27, and the contact tip 35. The inert gas flows out the welding gun, arrow 53, at the nozzle front end 54 to surround the weld wire 19 and shield the weld wire 19 from atmospheric air.

The particular nozzle 3 shown is comprised of two sections: a tubular cylindrical back section 57, and a tubular frusto-conical front section 59. The cylindrical back section 57 has an inner diameter 61 and an outer diameter 62 that are substantially parallel for the length of the cylindrical section. The frusto-conical section 59 joins to the cylindrical section at a junction 63. At the junction 63, the frusto-conical section has an outer surface 65 with an outer diameter 66 that is the same as the cylindrical section outer diameter 62. Also, the frusto-conical section has an inner surface 67 with an inner diameter 68 at the junction 63 that is equal to the inner diameter 61 of the cylindrical section.

In the illustrated construction, the outer surface 65 of the frusto-conical section 59 converges toward the nozzle front end 54 at a steeper angle than the inner surface 67. Consequently, the thickness of the wall 69 of the nozzle frusto-conical section 59 is not uniform between the junction 63 and the nozzle front end 54. Rather, the wall thickness decreases in the direction of the nozzle front end. As a result, the nozzle front end consists of a narrow annulus 71 having an outer diameter 72 and an inner diameter 74.

The retention of the nozzle 3 on the diffuser 23 constitutes an important feature of the present invention. Retention is achieved by means of the nozzle assembly insert 73. Also looking at FIG. 3, the insert 73 has an outer diameter 79 that presses against the insulator 75, an inner diameter 81, a back end 83, and a front end 85. There is an interior frusto-conical back ramp 87 at the intersection of the inner diameter 81 and the back end 83. The back ramp 87 makes an angle A with the insert longitudinal axis 89. A preferred angle A is approximately 30 degrees.

Near the front end 85 of the insert 73 is an internal thread 91. The preferred pitch of the thread 91 is approximately 0.193 inches. The thread 91 may have a cross-sectional form generally similar to a stub acme thread form, if desired. The flank of the thread that is toward the insert front end 85 is tapered at an angle B relative to the insert longitudinal axis 89, thereby forming a thread ramp 93. It is preferred that the angles A and B are equal. For proper assembly with the diffuser 23, the major diameter 94 of the insert thread is slightly smaller than the inner diameter 81. In the design in which a separate insert is not used, the internal thread and back ramp are machined directly into the insulator near the nozzle back end 77.

Turning to FIG. 4, the diffuser 23 has a circular flange 95 at the upstream end 25. The flange 95 intersects a frusto-conical back ramp 97. The diffuser back ramp 97 makes an angle A1 with the diffuser longitudinal axis 99. The angle A1 is equal to the angle A of the nozzle assembly insert 73. The diffuser back ramp intersects a cylindrical outer diameter 100 that is slightly smaller than the inner diameter 81 of the insert 73. Between the diffuser upstream end and downstream end 27 is an external thread 101. According to one aspect of the invention, the diffuser thread 101 has but a single turn. The external thread 101 has the same pitch and thread form as the internal thread 91 of the insert 73. In addition, the flank of the diffuser thread 101 that is toward the upstream end is tapered at an angle B1 relative to the diffuser longitudinal axis 99, thereby creating a diffuser thread ramp 103. The angle B1 is equal to the angle B of the insert. It is preferred that the angle B1 equal the angle A1 of the diffuser back ramp 97. The major diameter 105 of the diffuser thread is slightly less than the insert inner diameter 81.

Returning to FIG. 1, the nozzle assembly 56 is shown assembled to the diffuser 23. To do so, the insert 73 is slipped over the diffuser downstream end 27. The insert back end 83 and inner diameter 81 pass over the diffuser thread 101 until the insert thread 91 contacts the diffuser thread. The nozzle assembly is rotated slightly, if necessary, until the insert and diffuser threads mate. From the point of initial mating, the nozzle assembly is further turned. Doing so causes the insert ramp thread 93 to bear against and follow the diffuser thread ramp 103 and advance the nozzle assembly until the surface area of the insert back ramp 87 engages the surface area of the diffuser back ramp 97. As mentioned, the diffuser thread may have a single turn. In that case, the diffuser and insert are so dimensioned that the surface area of the insert back ramp engages the surface area of the diffuser back ramp at the completion of one turn of the nozzle assembly on the diffuser. A slight additional torque applied to the nozzle assembly produces a edging action of the insert on the diffuser. The wedging action is a result of the simultaneous engagement of the surface area of the insert back ramp 87 with the surface area of the diffuser back ramp 97, and the mating of the insert thread ramp 93 with the diffuser thread ramp 103. The wedging action of the insert and diffuser back ramp surface areas causes the insert and thus the nozzle assembly to remain firmly retained in place on the diffuser. The nozzle assembly remains firmly retained on the diffuser until a relatively substantial reverse torque is intentionally applied to the nozzle 3. When that occurs, a single reverse turn of the nozzle assembly is sufficient to remove it from the welding gun 2. If desired, the diffuser thread, and the diffuser and insert back ramps, can be dimensioned such that the insert back ramp engages the diffuser back ramp at the completion of more or less than one turn of the nozzle assembly.

A second major benefit of the engaged ramps 87, 97 and 93, 103 is that they cause the nozzle assembly insert 73 to automatically center on the diffuser 23 such that their respective longitudinal axes 89 and 99 coincide with each other and also with the common longitudinal axis 42. The passage 51 between the nozzle front end 54 and the contact tip 35 for the inert gas is thus uniform around the contact tip, which is highly beneficial for both shielding the welding arc 55 and economy of gas usage. Moreover, the sturdy and centered retention of the nozzle assembly 56 on the diffuser effectively eliminates the possibility that the nozzle front end could drift toward the contact tip during use.

Thus, it is apparent that there has been provided, in accordance with the invention, a MIG gun nozzle with self centering, quick release screw and reduced cross-sectional area at the front that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A MIG welding gun comprising:
  a. a head tube;
  b. a conductor having a threaded end that protrudes beyond an end of the head tube;
  c. a diffuser that defines a first longitudinal axis and that has upstream and downstream ends and a bore, the bore adjacent the upstream end having threads that screw to the conductor threaded end, the diffuser having a frusto-conical back ramp that makes a first predetermined angle relative to the first longitudinal axis, the diffuser further having an external diffuser thread of a predetermined pitch with a flank that is formed as a diffuser thread ramp that makes a second predetermined angle relative to the first longitudinal axis; and
d. a nozzle assembly assembled to the diffuser comprising:
   i. a nozzle having front and back ends, and a first inner diameter; and
   ii. means in the nozzle first inner diameter for mating with the diffuser thread and for engaging the diffuser back ramp when the nozzle assembly is fully assembled to the diffuser.

2. The MIG welding gun of claim 1 wherein the means for mating with the diffuser thread and for engaging the diffuser back ramp comprises an electrically insulative insulator pressed in the nozzle first inner diameter, the insulator having an internal thread of the predetermined pitch that mates with the diffuser thread, the insulator thread having a flank that is formed as an insulator thread ramp that mates with the diffuser thread ramp, and the insulator having a frusto-conical back ramp that engages the diffuser back ramp when the nozzle assembly is fully assembled to the diffuser.

3. The MIG welding gun of claim 1 wherein the means for mating with the diffuser thread and for engaging the diffuser ramp comprises:
   a. a tubular insulator pressed in the nozzle first inner diameter; and
   b. an insert concentric with the nozzle and pressed in the insulator, the insert defining a second longitudinal axis and having front and back ends, and a thread of the predetermined pitch mating with the diffuser thread, the insert thread having a flank that is formed as an insert thread ramp that mates with the diffuser thread ramp, and the insert having a frusto-conical back ramp that engages the diffuser back ramp when the nozzle assembly is fully assembled to the diffuser.

4. The MIG gun of claim 3 wherein the first and second predetermined angles are equal.

5. The MIG gun of claim 3 wherein the diffuser back ramp diverges toward the diffuser upstream end in relation to first longitudinal axis, and wherein the diffuser thread ramp diverges toward the diffuser downstream end in relation to first longitudinal axis,
   so that a wedging action is produced by the insert between the diffuser back and thread ramps when the nozzle assembly is assembled on the diffuser to thereby retain the nozzle assembly on the diffuser.

6. The MIG gun of claim 4 wherein the first and second predetermined angles are approximately 30 degrees, and wherein the diffuser back ramp diverges toward the diffuser upstream end and the diffuser thread ramp diverges toward the diffuser downstream end.

7. The MIG gun of claim 6 wherein the insert automatically centers on the diffuser to bring the first and second longitudinal axes concentric with each other when the nozzle assembly is fully assembled on the diffuser.

8. The MIG gun of claim 3 wherein the diffuser thread has one turn,
   so that the nozzle assembly is fully assemblable to and disassemblable from the diffuser with a single turn of the nozzle assembly on the diffuser.

9. The MIG gun of claim 8 wherein the pitch of the diffuser and insert threads is approximately 0.193 inches.

10. The MIG gun of claim 3 wherein:
    a. the diffuser has a circular flange at the upstream end thereof, and an outer diameter; and
    b. the diffuser back ramp intersects the circular flange and the outer diameter.

11. The MIG gun of claim 10 wherein:
    a. the insert has an inner diameter; and
    b. the insert back ramp intersects the insert back end and the inner diameter.

12. The MIG gun of claim 3 wherein the insert and diffuser thread ramps, and the insert and diffuser back ramps, are so dimensioned that the insert back ramp engages the diffuser back ramp when the nozzle assembly has made a single turn on the diffuser,
    so that the nozzle assembly is fully assembled to and disassembled from the nozzle by a single turn of the nozzle assembly on the diffuser.

13. The MIG gun of claim 3 wherein the nozzle comprises:
    a. a cylindrical section adjacent the back end and having a first outer diameter and the first inner diameter, the cylindrical section first outer diameter and first inner diameter defining a first wall thickness; and
    b. a frusto-conical section adjacent the front end that joins the cylindrical section at a junction, the frusto-conical section having inner and outer surfaces that converge toward the nozzle front end, a second inner diameter at the junction that is equal to the first inner diameter, and a second outer diameter at the junction that is equal to the first outer diameter, the frusto-conical section further having a third outer diameter and a third inner diameter at the nozzle front end that cooperate to define a second wall thickness.

14. The MIG gun of claim 13 wherein the second wall thickness is less than the first wall thickness.

15. The MIG gun of claim 13 wherein the frusto-conical section outer surface converges toward the nozzle front end at a steeper angle than the frusto-conical section inner surface.

16. A MIG gun nozzle with self centering, quick release screw and reduced cross-sectional area at the front comprising:
    a. a nozzle assembly comprising:
       i. a nozzle that defines a nozzle longitudinal axis;
       ii. an insulator pressed in the nozzle; and
       iii. an insert inside the insulator, the insert defining an insert longitudinal axis concentric with the nozzle longitudinal axis and having a selected surface and an internal thread of a predetermined pitch and thread form; and
    b. a diffuser that defines a diffuser longitudinal axis and that has an external thread of the predetermined pitch and thread form and having at least one complete turn, the diffuser having a selected diffuser surface that is engaged by the selected insert surface when the nozzle assembly is fully assembled to the diffuser, the selected diffuser and insert surfaces cooperating to limit the nozzle assembly to one complete turn on the diffuser to fully assemble the nozzle assembly to the diffuser.

17. The MIG gun of claim 16 wherein the predetermined pitch is approximately 0.193 inches.

18. The MIG gun of claim 16 wherein:
    a. the selected diffuser surface is an exterior frusto-conical back ramp; and
    b. the selected insert surface is an interior back ramp that engages the diffuser back ramp when the nozzle assembly is fully assembled to the diffuser.

19. The MIG gun of claim 18 wherein the diffuser back ramp makes a first predetermined angle with the diffuser longitudinal axis, and where the insert back ramp makes the first predetermined angle with the insert longitudinal axis.

20. The MIG gun of claim 19 wherein the first predetermined angle is approximately 30 degrees.

21. The MIG gun of claim 18 wherein:
   a. the insert thread is formed with an insert thread ramp that makes a second predetermined angle with the insert longitudinal axis;
   b. the diffuser thread is formed with a diffuser thread ramp that makes the second predetermined angle with the diffuser longitudinal axis and that mates with the insert thread ramp when the nozzle assembly is assembled to the diffuser; and
   c. the second predetermined angle is substantially equal to the first predetermined angle.

22. The MIG gun of claim 21 wherein the insert thread ramp and the insert back ramp engage the diffuser thread ramp and diffuser back ramp, respectively, simultaneously when the nozzle assembly is fully assembled on the diffuser, the diffuser thread and back ramps cooperating with the insert thread and back ramps, respectively, to produce a wedging action between the insert and the diffuser that retains the nozzle assembly on the diffuser,
   so that a substantial reverse torque is required on the nozzle assembly to disassemble the nozzle assembly from the diffuser.

23. The MIG gun of claim 21 wherein:
   a. the insert thread ramp and insert back ramp engage the diffuser thread ramp and diffuser back ramp, respectively, simultaneously when the nozzle assembly is fully assembled on the diffuser; and
   b. the diffuser thread ramp and diffuser back ramp cooperate with the insert thread ramp and insert back ramp, respectively, to automatically center the nozzle longitudinal axis concentric with the diffuser longitudinal axis when the nozzle assembly is fully assembled on the diffuser.

24. The MIG gun of claim 16 wherein the nozzle comprises:
   a. a cylindrical section having a back end, and a first outer diameter and a first inner diameter that define a first wall thickness; and
   b. a frusto-conical section joined to the cylindrical section at a junction and having a front end opposite the cylindrical section back end, the frusto-conical section having inner and outer surfaces that converge toward the nozzle front end, a second inner diameter at the junction that is equal to the first inner diameter, and a second outer diameter at the junction that is equal to the first outer diameter, the frusto-conical section further having third inner and outer diameters at the nozzle front end that cooperate to define a second wall thickness.

25. The MIG gun of claim 24 wherein the second wall thickness is less than the first wall thickness.

26. The MIG gun of claim 24 wherein the frusto-conical section outer surface converges toward the nozzle front end at a steeper angle than the frusto-conical section inner surface.

27. A method of assembling a MIG welding gun comprising the steps of:
   a. providing a diffuser having a diffuser longitudinal axis, a selected surface, and an external thread of a predetermined pitch and thread form;
   b. providing a nozzle assembly having a nozzle with a nozzle longitudinal axis, an insulator inside the nozzle, and an insert inside the insulator, the insert having a selected surface and an internal thread of the predetermined pitch and thread diameter; and
   c. turning the insert thread a single turn on the diffuser thread and then engaging the selected insert surface with the selected diffuser surface and thereby fully assembling the nozzle assembly on the diffuser with the single turn of the nozzle assembly.

28. The method of claim 27 wherein:
   a. the step of providing a diffuser having a selected surface comprises the step of providing the diffuser with a frusto-conical diffuser back ramp;
   b. the step of providing an insert having a selected surface comprises the step of providing the insert with a frusto-conical insert back ramp; and
   c. the step of engaging the selected insert surface with the selected diffuser surface comprises the step of engaging the diffuser back ramp with the insert back ramp when the nozzle assembly is fully assembled on the diffuser.

29. The method of claim 28 comprising the further steps of:
   a. providing the diffuser with a frusto-conical diffuser thread ramp on the external thread;
   b. providing the insert with a frusto-conical insert thread ramp on the internal thread; and
   c. mating the diffuser thread ramp with the insert thread ramp simultaneously with the engagement of the insert back ramp with the diffuser back ramp when the nozzle assembly is fully assembled on the diffuser.

30. The method of claim 29 comprising the further step of producing a wedging action between the insert and the diffuser and thereby firmly retaining the nozzle assembly on the diffuser.

31. The method of claim 30 comprising the further step of applying a substantial reverse torque on the nozzle assembly and disassembling the nozzle assembly from the diffuser.

32. The method of claim 29 comprising the further step of centering the insert on the diffuser and thereby bringing the nozzle longitudinal axis to be concentric with the diffuser longitudinal axis.

33. A method of assembling a MIG welding gun comprising the steps of:
   a. providing a diffuser having a longitudinal axis, a diffuser frusto-conical back ramp, and an external thread of a predetermined pitch and thread form;
   b. providing a nozzle assembly having a nozzle with a nozzle longitudinal axis, an insulator inside the nozzle, and an insert inside the insulator concentric with the nozzle, the insert having an insert frusto-conical back ramp and an internal thread of the predetermined pitch and thread form; and
   c. turning the insert thread on the diffuser thread until the insert back ramp engages the diffuser back ramp.

34. The method of claim 33 comprising the further step of centering the nozzle longitudinal axis to be concentric with the diffuser longitudinal axis.

35. The method of claim 34 wherein the step of centering the nozzle longitudinal axis comprises the steps of:
   a. providing the diffuser external thread with a frusto-conical diffuser thread ramp;
   b. providing the insert internal thread with a frusto-conical insert thread ramp; and c. turning the insert thread on the diffuser thread and simultaneously engaging the insert back ramp with the diffuser back ramp and the insert thread ramp with the diffuser thread ramp.

36. The method of claim 33 wherein the step of turning the insert thread on the diffuser thread comprises the step of turning the nozzle assembly a single turn on the diffuser thread whereupon the insert back ramp engages the diffuser back ramp.

37. The method of claim 36 wherein the step of turning the insert thread on the nozzle thread the single turn comprises the step of advancing the nozzle assembly approximately 0.193 inches along the diffuser.

38. The method of claim 35 wherein the step of simultaneously engaging the insert back ramp with the diffuser back ramp and the insert thread ramp with the diffuser thread ramp comprises the step of producing a wedging action between the insert and the diffuser and thereby retaining the nozzle assembly on the diffuser.

39. The method of claim 38 comprising the further step of applying a reverse torque to the nozzle assembly and releasing the nozzle assembly from the diffuser.

* * * * *